US00RE44039E

(19) United States
(12) Reissued Patent
Cook

(10) Patent Number: US RE44,039 E
(45) Date of Reissued Patent: Mar. 5, 2013

(54) DOOR SUICIDE ALARM

(75) Inventor: Francis E. Cook, Marthasville, MO (US)

(73) Assignee: The Door Switch, St. Louis, MO (US)

(21) Appl. No.: 13/311,219

(22) Filed: Dec. 5, 2011

Related U.S. Patent Documents

Reissue of:
(64) Patent No.: 7,466,237
Issued: Dec. 16, 2008
Appl. No.: 11/505,117
Filed: Aug. 16, 2006

U.S. Applications:
(63) Continuation of application No. 12/915,218, filed on Oct. 29, 2010, now Pat. No. Re. 42,991.

(51) Int. Cl.
*G08B 21/00* (2006.01)
*G08B 13/08* (2006.01)

(52) U.S. Cl. ..... 340/665; 340/666; 340/668; 340/545.6; 340/545.7; 340/545.8; 340/539.1

(58) Field of Classification Search ..... None
See application file for complete search history.

(56) References Cited

U.S. PATENT DOCUMENTS

| | | | | |
|---|---|---|---|---|
| 3,890,608 | A | 6/1975 | Peterson | |
| 3,947,835 | A * | 3/1976 | Laymon | 340/566 |
| 4,244,426 | A | 1/1981 | Kerr | |
| 4,267,549 | A | 5/1981 | Taylor | |
| 4,276,545 | A | 6/1981 | Jarvis et al. | |
| RE30,716 | E | 8/1981 | Suska | |
| 4,284,980 | A | 8/1981 | Hoinski | |
| 4,287,514 | A | 9/1981 | Wartman et al. | |
| 4,292,629 | A | 9/1981 | Kerr et al. | |
| 4,303,909 | A | 12/1981 | Martin | |
| 4,342,209 | A | 8/1982 | Kleefeldt | |
| 4,350,977 | A * | 9/1982 | Dykes | 340/545.2 |
| 4,358,750 | A | 11/1982 | Webster | |
| 4,361,730 | A | 11/1982 | Barber et al. | |
| 4,370,644 | A | 1/1983 | Droz | |
| 4,383,242 | A | 5/1983 | Sassover et al. | |
| 4,400,696 | A | 8/1983 | Klingensmith | |
| 4,407,141 | A | 10/1983 | Paddock | |
| 4,419,939 | A | 12/1983 | Reverte | |
| 4,427,975 | A | 1/1984 | Kinzie | |
| 4,440,428 | A | 4/1984 | Jessup et al. | |
| 4,467,391 | A | 8/1984 | Refoy et al. | |
| 4,517,556 | A | 5/1985 | Saul et al. | |
| 4,528,558 | A | 7/1985 | Steers et al. | |
| 4,533,904 | A | 8/1985 | Steinman, Jr. | |

(Continued)

FOREIGN PATENT DOCUMENTS

| | | | |
|---|---|---|---|
| DE | 550978 | | 5/1932 |
| JP | 2009251841 | A * | 10/2009 |

OTHER PUBLICATIONS

Securitech Group, Inc.: SEDA™ Emergency Door Alarm: New System Information, 2 pages, Mar. 24, 2009.

(Continued)

*Primary Examiner* — Julie Lieu
(74) *Attorney, Agent, or Firm* — Harness, Dickey & Pierce, P.L.C.

(57) ABSTRACT

A door alarm system is provided which activates an alarm when a door (such as the door to the patient's room, a bathroom door within the patient room, etc.) is closed with something (such as a sheet, cord or the like) over the top of door.

33 Claims, 10 Drawing Sheets

U.S. PATENT DOCUMENTS

| | | | | |
|---|---|---|---|---|
| 4,543,458 | A | | 9/1985 | Holce et al. |
| 4,624,120 | A | | 11/1986 | Hoffman et al. |
| 4,675,659 | A | | 6/1987 | Jenkins, Jr. et al. |
| 4,764,111 | A | | 8/1988 | Knierim |
| 4,772,877 | A | | 9/1988 | Rice, Jr. et al. |
| 4,794,368 | A | | 12/1988 | Grossheim et al. |
| 4,816,803 | A | | 3/1989 | Brown |
| 4,851,814 | A | | 7/1989 | Rehberg |
| 4,907,845 | A | | 3/1990 | Wood |
| 4,915,431 | A | | 4/1990 | Bailey |
| 4,942,747 | A | | 7/1990 | Pinnow |
| 5,076,260 | A | * | 12/1991 | Komatsu ..... 601/59 |
| 5,303,677 | A | | 4/1994 | Jones |
| 5,341,123 | A | * | 8/1994 | Schuman et al. ..... 340/546 |
| 5,341,126 | A | | 8/1994 | Boykin |
| 5,479,152 | A | | 12/1995 | Walker et al. |
| 5,515,858 | A | | 5/1996 | Myllymäki |
| 5,551,187 | A | | 9/1996 | Brouwer et al. |
| 5,646,912 | A | | 7/1997 | Cousin |
| 5,696,493 | A | | 12/1997 | Einck |
| 5,717,380 | A | | 2/1998 | Zehrung |
| 5,751,214 | A | | 5/1998 | Cowley et al. |
| 5,754,107 | A | | 5/1998 | Ferrantelli |
| 5,783,995 | A | | 7/1998 | Jackson |
| 5,969,607 | A | | 10/1999 | Cox |
| 5,977,873 | A | | 11/1999 | Woods |
| 6,053,546 | A | | 4/2000 | Frolov |
| 6,094,139 | A | | 7/2000 | Moore |
| 6,544,200 | B1 | | 4/2003 | Smith et al. |
| 7,327,219 | B2 | | 2/2008 | Lederer, IV |
| 7,466,237 | B1 | | 12/2008 | Cook |
| 7,900,398 | B2 | * | 3/2011 | Liles, Jr. ..... 49/42 |
| 7,999,690 | B1 | * | 8/2011 | Shilts ..... 340/666 |
| RE42,991 | E | | 12/2011 | Cook |
| 2005/0179536 | A1 | | 8/2005 | Lederer, IV |
| 2008/0061969 | A1 | * | 3/2008 | Okude et al. ..... 340/541 |
| 2008/0061970 | A1 | * | 3/2008 | Imai et al. ..... 340/545.1 |
| 2010/0325980 | A1 | * | 12/2010 | Gilchrist ..... 52/204.1 |

OTHER PUBLICATIONS

Door Control Services, Inc.: Top Door Alarm™, 2 pages, Feb. 19, 2010.

Best Access Systems (Stanley Security Solutions, Inc.): SSS-SEDA (Emergency Door Alarm) Packing List, Installation Instructions, and Wiring Information, pp. 1-3 (3 pages), Sep. 23, 2009.

The Door Switch: The Competitive Advantage, pp. 1-3 (3 pages), 2008-2009.

* cited by examiner

DOOR SUICIDE ALARM

Matter enclosed in heavy brackets [ ] appears in the original patent but forms no part of this reissue specification; matter printed in italics indicates the additions made by reissue.

CROSS-REFERENCE TO RELATED APPLICATIONS

[Not Applicable] *Notice: This reissue application is a continuation of U.S. patent application Ser. No. 12/915,218, which was filed on Oct. 29, 2010, for the reissue of U.S. Pat. No. 7,466,237 (which issued Dec. 16, 2008). As such, more than one reissue application has been filed for the reissue of U.S. Pat. No. 7,466,237, including the present application and U.S. patent application Ser. No. 12/915,218 (now U.S. Pat. No. Re. 42,991 reissued Dec. 6, 2011). The present application is a continuation reissue of U.S. Pat. No. 7,466,237. The entire disclosures of the above application and patent are incorporated herein by reference.*

STATEMENT REGARDING FEDERALLY SPONSORED RESEARCH OR DEVELOPMENT

Not Applicable.

BACKGROUND OF THE INVENTION

The present invention relates to door alarms, and, in particular to a door alarm which will notify personnel, for example, of a psychiatric hospital, that a patient is attempting to commit suicide.

It is not uncommon for patients in, for example, psychiatric hospitals, to attempt to commit suicide. In order to prevent patients from committing suicide, patient rooms are cleared of most things with which patients can commit suicide. For example, patients do not wear belts. One way in which patients do attempt to commit suicide is to tie a knot in the end of a bed sheet, drape the bed sheet over the top of a door (either the door to the patient's room or the bathroom door in the patient's room), and close the door. The knot on the end of the door will prevent the sheet from sliding through the closed door, and the patient can then hang him or herself with the sheet.

Currently, there is no known device that is available to notify hospital personnel when patient is attempting to commit suicide by hanging.

BRIEF SUMMARY OF THE INVENTION

Briefly stated, a door alarm system is provided which activates an alarm when a patient door (such as the door to the patient's room, a bathroom door within the room, etc.) is closed with something (such as a sheet, cord or the like) over the top of the door.

The door, as is known, is mounted in a door opening defined by a door frame. The door frame is comprised of opposed side jambs and a header extending between the jambs. The door is mounted to one of the jambs by a hinge assembly so that it can move between an open position and a closed position. The door, itself, has a top, bottom and sides. When the door is closed, a gap is formed between the door top and the bottom of the header.

The alarm system comprises a pressure sensitive switch mounted to the door near the top of the door and the alarm.

The alarm can be a visual and/or an audible alarm, and can be positioned outside the patient's room (i.e., on the wall outside the room) or in a central location, such as a nurses station. The switch is an elongate switch and extends substantially the full side-to-side width of the door. The switch extends into the gap when the door is closed. The switch is in communication with the alarm. Thus, when the switch detects pressure anywhere along its length, the switch will transmit a signal to activate the alarm.

In one embodiment, the door includes an elongate channel in the top of the door, and the switch is mounted in the channel. Depending on the size of the channel relative to the switch, a spacer can be provided to raise the switch, or to otherwise position the switch within the channel. In another embodiment, the switch is mounted to a door beam, which in turn is mounted to the door. The system, in this embodiment, includes a header beam mounted to the wall or header above the door bear, such that a gap is formed between the switch and the header beam.

In a preferred embodiment, a bracket mounted to the door (either in the channel or to the door beam) and the switch is held by the bracket. The bracket has a base and opposed side members extending upwardly from the base; the side members being shaped to receive the switch and hold the switch in the bracket. The bracket can be an elongate bracket which extends substantially the full length of the door.

In one embodiment, the switch is hardwired to the alarm, and the switch includes a lead wire to electrically connecting the switch and the alarm. The lead wire extends along at least a portion of the height of the door proximate the hinge. The wire then passes into or through the wall to be electrically connected to the alarm. To facilitate hiding of the wire, the hinge is a continuous or piano-type hinge and extends downwardly from near the top of the door. Preferably, the hinge extends the full length of the door. The wire is either secured to the outside of the hinge or is positioned behind the hinge. A hinge cover can be provided to cover up any exposed wire, if necessary.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
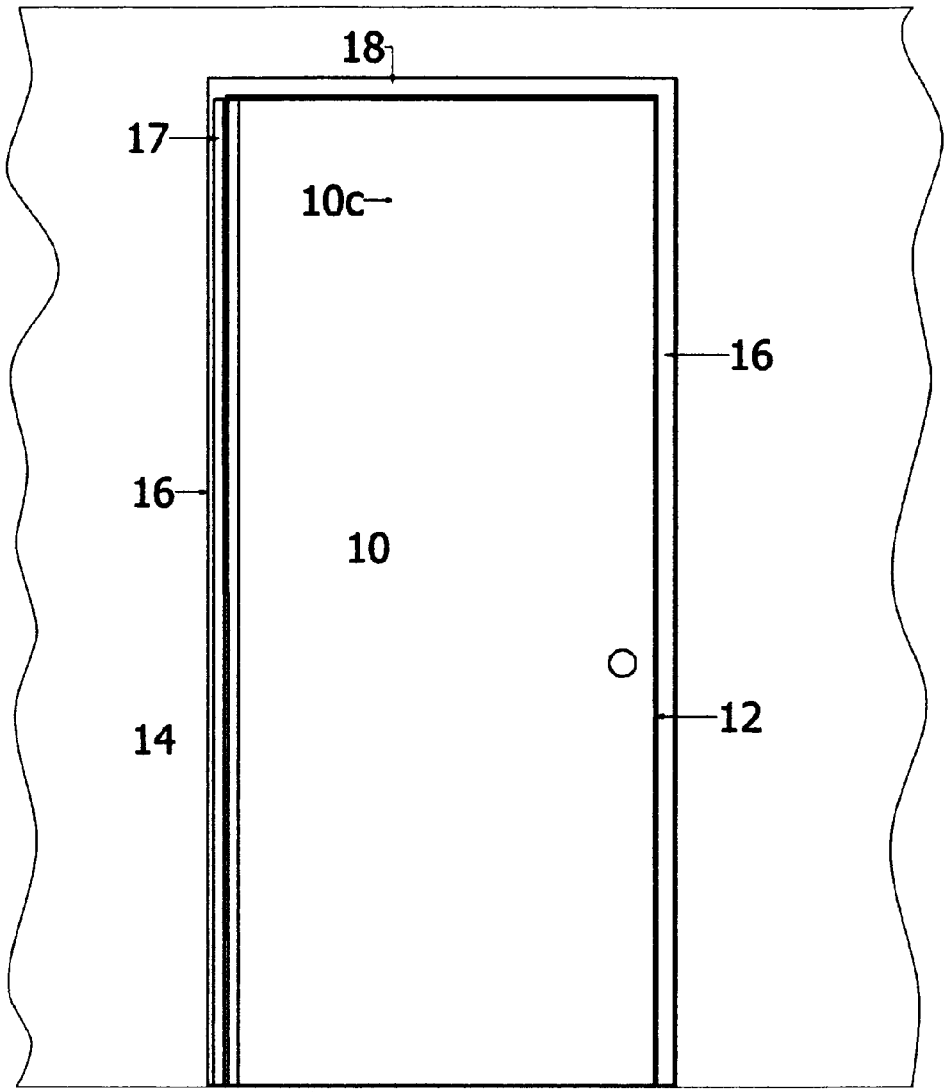
FIG. 1 is a plan view of a door in which an alarm of the present invention has been installed.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A door 10 is positioned in a door opening 12 in wall 14. The door has a top surface 10a and side surfaces 10b extending between the door's front and back surfaces 10c. The door opening 12 is defined by opposed door jams 16 which extend upwardly from the floor and a header 18 which extends between the jambs 16 at the top of the door opening 12. As is known, the door is mounted in the door opening 12 by a hinge 17. A gap 20 exists between the top 10a of the door 10 and the header 18.

Figure 2A:
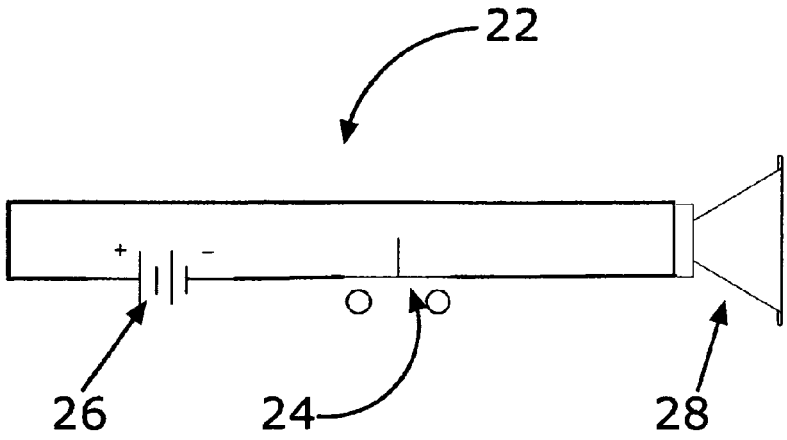
FIGS. 2A and 2B are examples of illustrative diagrams of an alarm system circuit of the present invention.
Figure 2B:
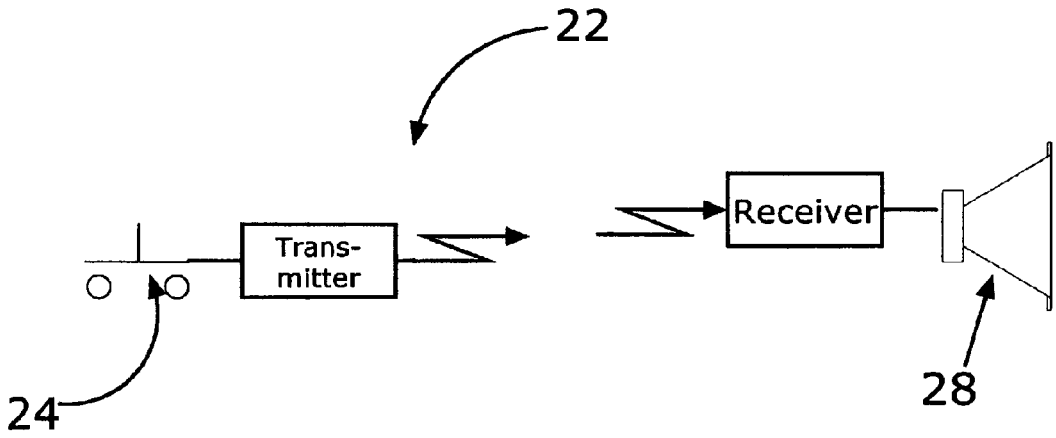
Figure 3A:
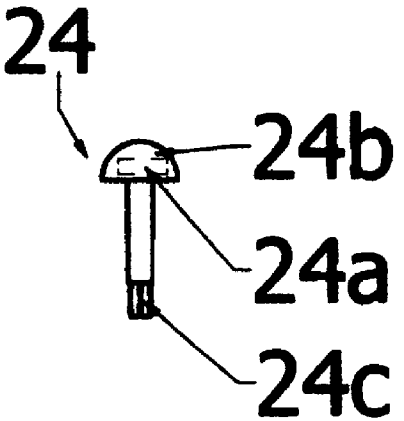
FIGS. 3A and B are cross-sectional and plan views of an illustrative switch used in conjunction with the alarm system.
Figure 3B:
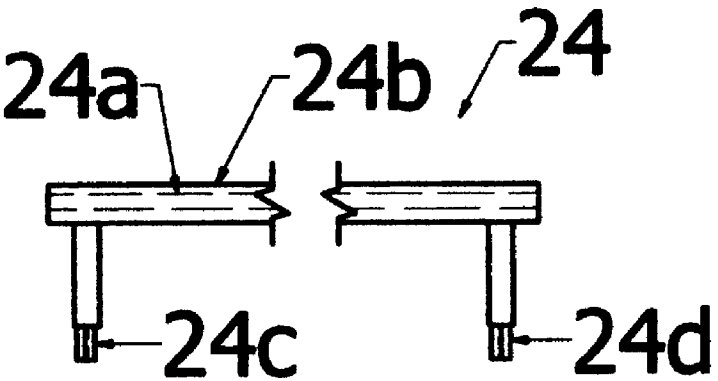

Turning to FIG. 2, an alarm system 22 of the present invention includes a switch 24 which is mounted at the top of the door 10. The switch is preferably normally open a ribbon or bumper switch which extends substantially the full width of the door. The ribbon switch can be a switch, such as is supplied by Recora Company under the name Sensi-Switch. An illustrative example of the switch 24 is shown in FIGS. 3A and 3B. The switch 24 comprises a sensing element 24a, such as an electrode which is molded or otherwise contained in a housing 24b. The housing 24b can be made of a plastic, or any other material which can withstand the environment into which the switch will be placed. The ribbon switch is flexible. A lead 24c, which is operatively connected to the electrode within the housing 24b exits the housing 24b to place the switch in communication with the alarm 28. As seen, a second lead 24d can exit the housing at the opposite end of the switch. In a two wire system (which would include leads 24c and 24d), the second lead 24d can contain an in-line resistor to monitor for breaks in the circuit. Hence, the integrity of the system is continuously monitored. Should the integrity of the system be compromised, the switch can issue an alarm to alert personnel that the system needs attention.

The sensing element 24a is pressure sensitive and is activated to transmit a signal when it detects a pressure being applied to the housing. Preferably, the pressure needed to activate the sensing element is fairly low, for example, the switch can have an activation pressure in the range of 3-5 psi. The housing, as seen in FIG. 3A is semi-circular in cross-section. As will be explained more fully below, the switch 24 extends into the door gap 20, and can even extend so far as to contact the bottom of the door header 18, so long as such contact does not close the switch 24. Although the sensing element 24a is shown to be an electrode, the sensing element can be a pair of elongate contacts which are spaced apart by compressible insulating members. In this example, when the elongate housing is compressed at any point along the housing, the contacts will be pushed into electrical contact with each other at the point of compression, thereby closing the switch.

The circuit 22 additionally includes a source of power 26 and an alarm 28. The alarm system can be hard-wired into the electrical system of a building, and hence, the power source 26 would be the power source for the building. Alternatively, the power source could be a battery or the alarm system could include a plug, and the door alarm would then be plugged into an outlet proximate the door. Should a patient place a sheet over the top of the door and then close the door (in an attempt to use the sheet to hang him or herself), the thickness of the sheet in the gap 20 will exert pressure on the switch 24 when the door is closed, thereby closing the switch. Closing of the switch 24 will, in turn, cause the alarm 28 to be activated, thereby notifying hospital personnel of a suicide attempt.

The alarm 28 can take several forms. It can be an audible and/or visual alarm. The alarm can be mounted by the patient's door (on the outside of the patient's room) so that the alarm can be easily seen by hospital personnel when it is activated. Alternatively, the alarm 28 can be at a central location (such as a nurse's station) so that hospital staff manning the nurse's station will be notified at the nurse's station of the suicide attempt. In this case, the alarm at the nurse's station would include an indication of the room from which the alarm originates. The alarm (whether at the nurse's station or on the wall outside the patient's room) can be hard wired as shown in FIG. 3A or wireless as shown in FIG. 3B. If wireless, then the alarm system would include a transmitter in conjunction with the switch which is activated when the switch is closed. The alarm 28 would then include a receiver. The alarm 28 would then be activated by the receiver upon detection of a signal from the transmitter. Additionally, the alarm system, if wireless, can send a signal to staff beepers, personally informing staff of a suicide attempt. Again, a beeper notification would include an indication of the room from which the alarm originated.

Figure 4A:
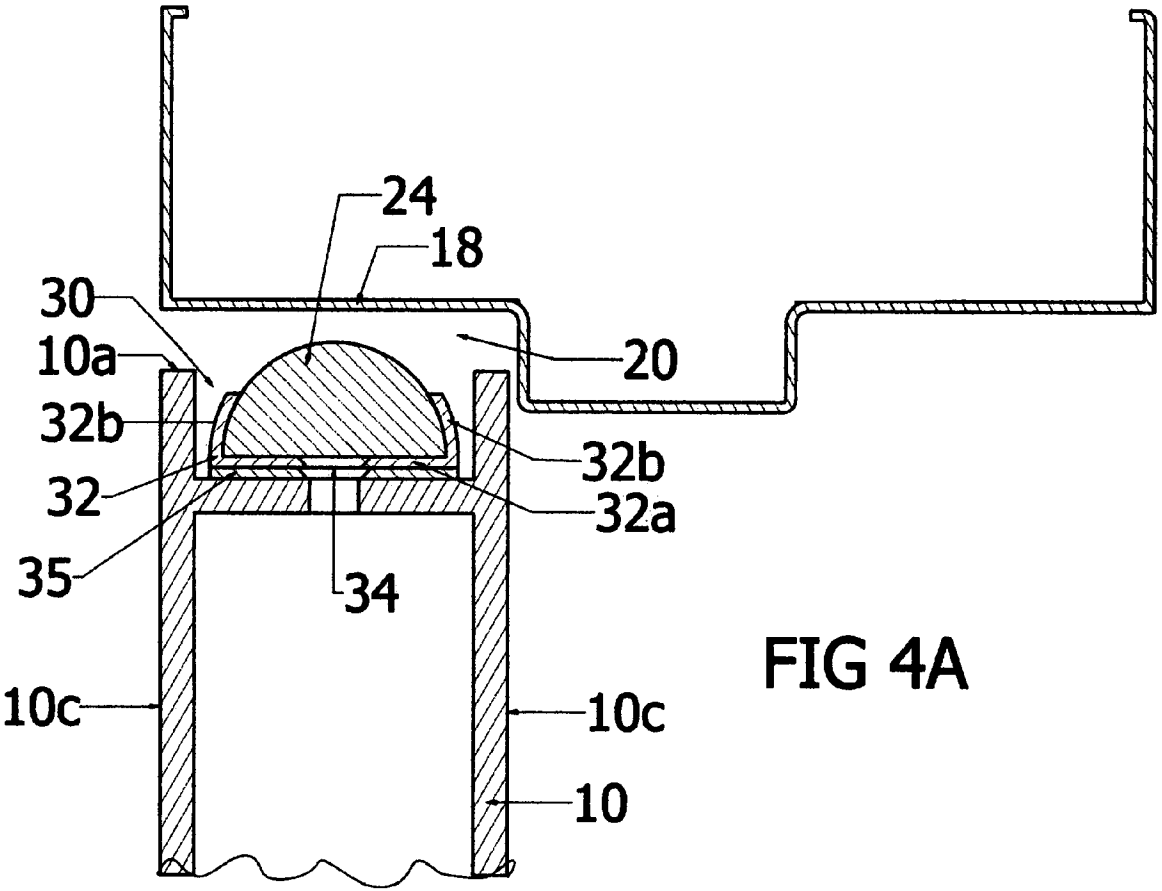
FIGS. 4A and B are cross-sectional views showing a first illustrative manner of mounting an alarm switch for on a door.
Figure 4B:
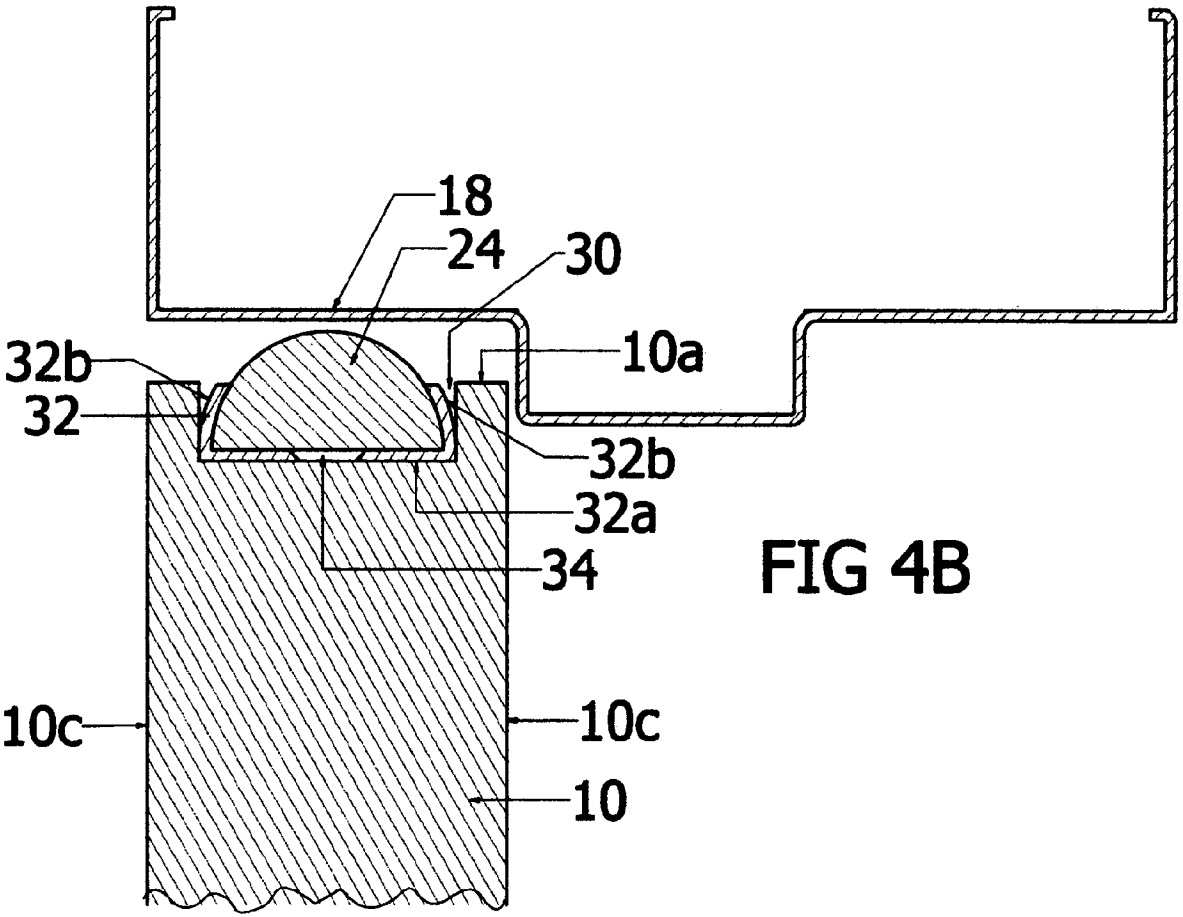

A first illustrative manner of mounting the switch 24 to a door is shown in FIGS. 4A and 4B. In each of these figures, the door 10 includes a channel 30 in the top surface 10a of the door. The door 10 of FIG. 3A is a steel door, and the channel 30 is formed in the top surface 10a during manufacturing of the door. The door 10 of FIG. 3B, on the other hand, is a wooden door. In this door, the channel 30 can be original (i.e., placed in the door top surface during manufacturing of the door), or it can be routed into the door top surface 10a during installation of the alarm system 22. The channel 30 extends substantially the full length of the door 10.

A switch bracket 32 is secured in the channel 30 to hold the switch 24 in place. The bracket 32 comprises a base 32a and a pair of side members 32b. The bracket 32 extends substantially the length of the channel 30, and hence, substantially the length of the door 10. The bracket base 32a has a width approximately equal to the width of the switch 24, and the bracket side members 32b are shaped to hold the switch in the bracket. To this end, the side members 32b can be shaped correspondingly to the switch and the switch 24 can be pressed or slid into the bracket. The bracket 32 can be provided with screw holes 34 in its base 32a through which screws, bolts, or other fasteners can extend to secure the bracket 32 in the door channel 30. The bracket 32 can also be secured in the channel by other means. For example, adhesives can be used to secure the bracket. The adhesive could be a liquid adhesive, such as a glue or epoxy; or the adhesive can, for example, be a pressure or heat activated adhesive which is supplied in a strip or sheet format, and is then applied either to the bottom of the bracket or to the channel, and is ultimately positioned between the bottom of the channel The switch 24 is received in the bracket 32. As seen in FIGS. 4A and 4B, the top of the switch 24 is above the top 10a of the door 10. If the channel 30 is too deep, spacers 35 can be provided along the channel bottom to raise the switch. However, the switch 24 should not be so high, such that it will be activated when the door is closed under normal use conditions. Spacers can also be positioned between the bracket side members 32b and the channel wall if the channel is wider than the bracket.

Figure 5:
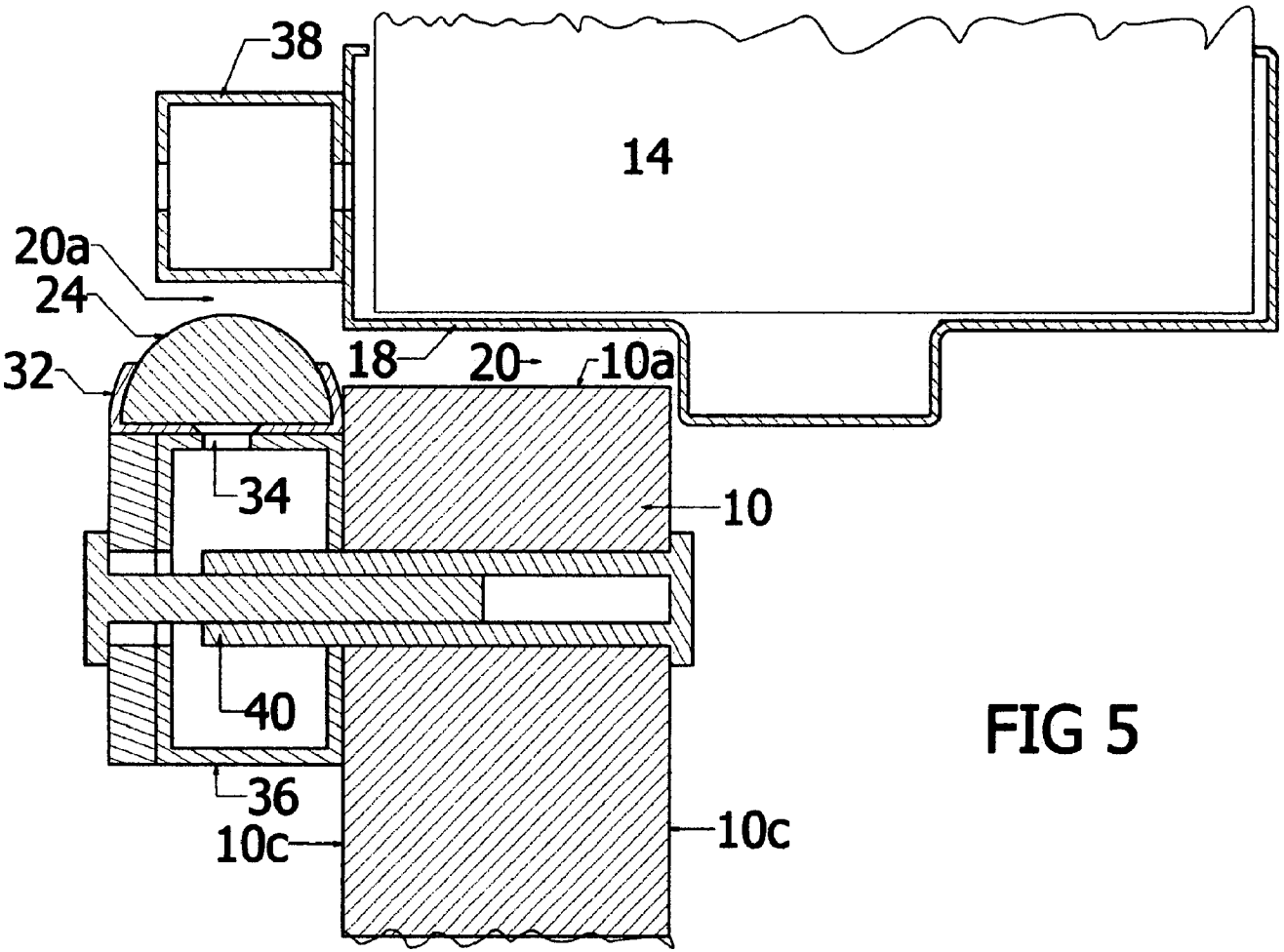
FIG. 5 is a cross-sectional view showing a second illustrative manner of mounting the alarm switch on a door.

FIG. 5 shows an alternate mounting method of the switch 24. This alternate method can be used, for example, when the gap 20 between the door top 10a and the door header 18 is too small to accommodate the switch 24, and the door does not include a channel 30 or the channel 30 cannot be formed in the door top surface. In this instance, a door beam 36 is mounted to the door 10, and a header beam 38 is mounted to the door header 18 or to the wall 14 above the door opening 12. The beams 36 and 38 can be mounted to the door 10 and header 18, respectively, in any conventional manner. The door beam 36 is shown to be mounted by means of a bolt/bolt sleeve set 40 and the header beam 38 is shown to be mounted to the header 18 by means of an adhesive. The switch bracket 32 is mounted to the top of the door beam 36. The door beam 36 has a width such that the bracket fastener openings 34 will be over the door beam so that the bracket can be fixed to the top of the door beam 36. The header beam 38 is mounted to the header at a position and is sized (i.e., has a front-to-back depth) such that there will be a slight gap 20a between the top of the switch 24 and the bottom of the header beam 38 when the door is closed. This gap 20a replaces the gap 20 in operation of the alarm system. The gap 20a is sized, such that a bunched-up sheet or the like, when placed over the door, will press down on the switch 24 to activate the alarm when the door is closed.

As noted above, the ribbon switch 24 extends substantially the full length of the door. Further, the sensing element 24a of the switch 24 also extends substantially the full length of the door. Thus, the switch is not be position sensitive. That is, the switch will be activated no matter where a patient should place a sheet relative to the door length.

Figure 6:
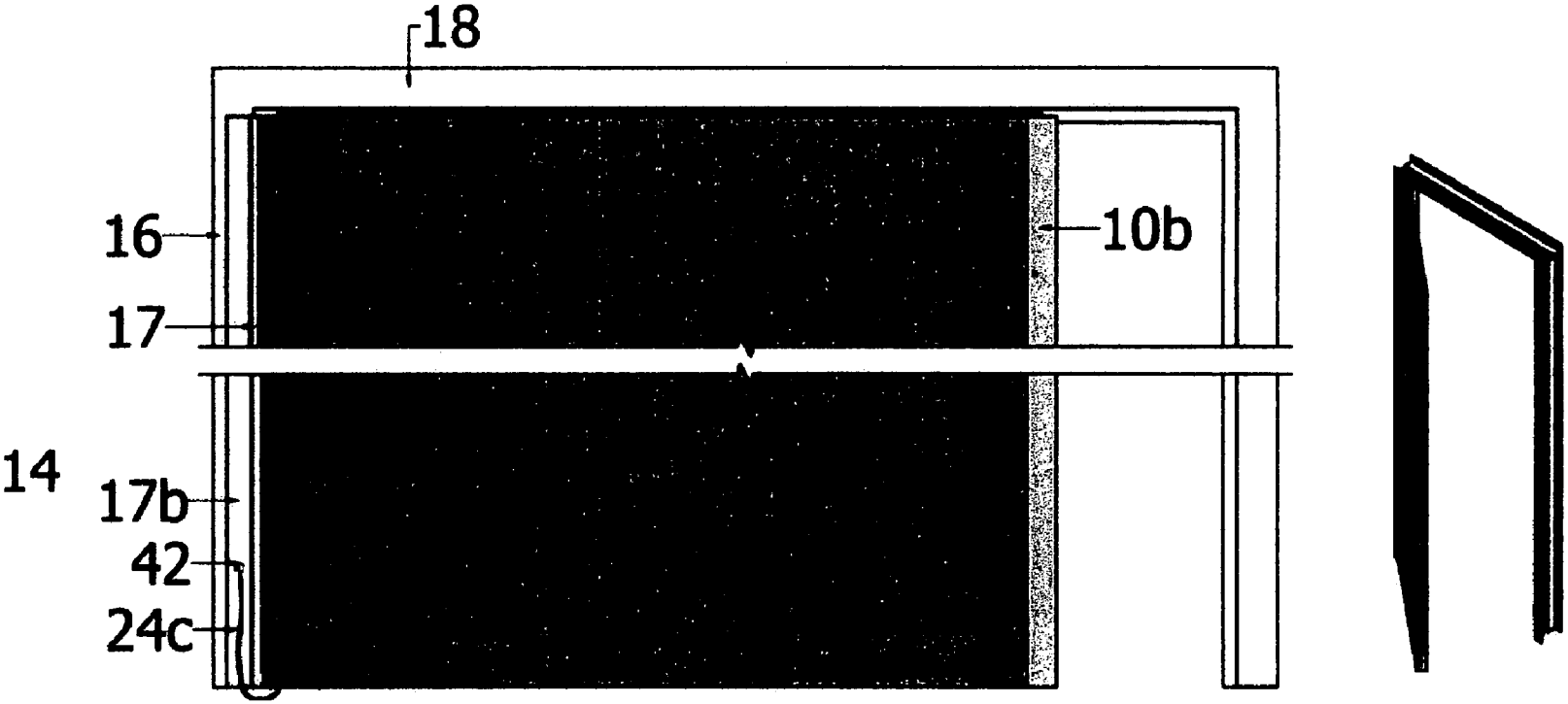
FIG. 6 is a perspective view showing a wire lead extending along a door hinge.

An illustrative example of the wiring of the alarm system is shown further in FIGS. 6-9. In FIG. 6, the switch lead 24c can be seen exiting the switch housing 24b through a bottom or side of the housing spaced inwardly from the end of the housing. The switch lead 24 is positioned near the hinge side of the door. Inasmuch as the ribbon switch 24 extends substantially the full length of the door, having the lead 24c exit the housing inwardly slightly from the end of the housing will reduce the possibility of the lead from getting squeezed between the door edge 10b and the door jamb 16 when the door is closed.

Figure 7:
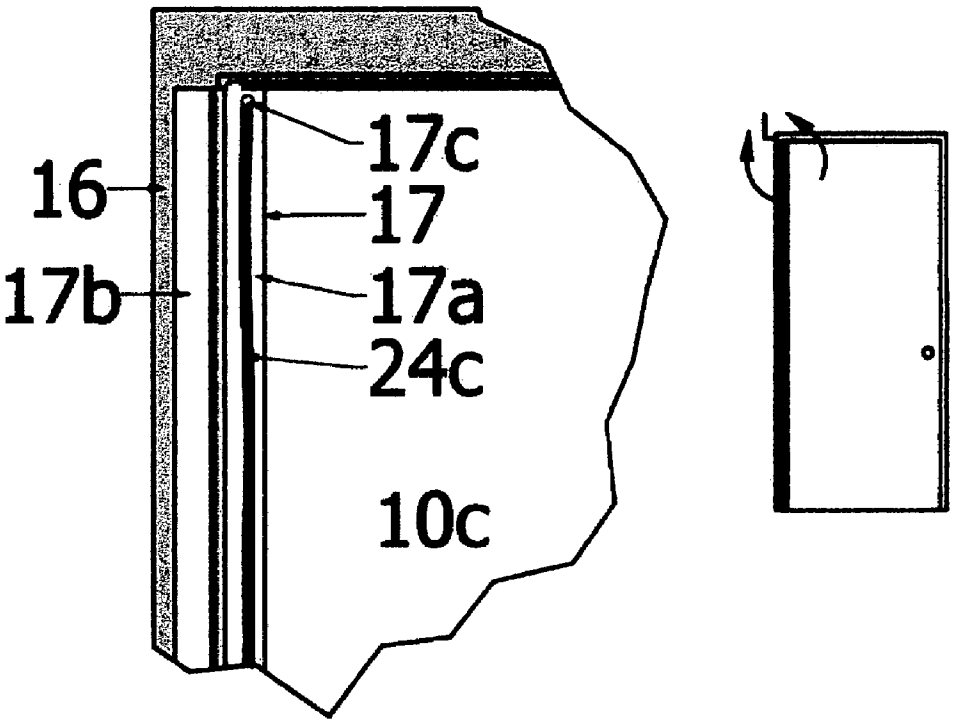
FIG. 7 is a perspective view showing the switch wire extending along a hinge member.
Figure 8:
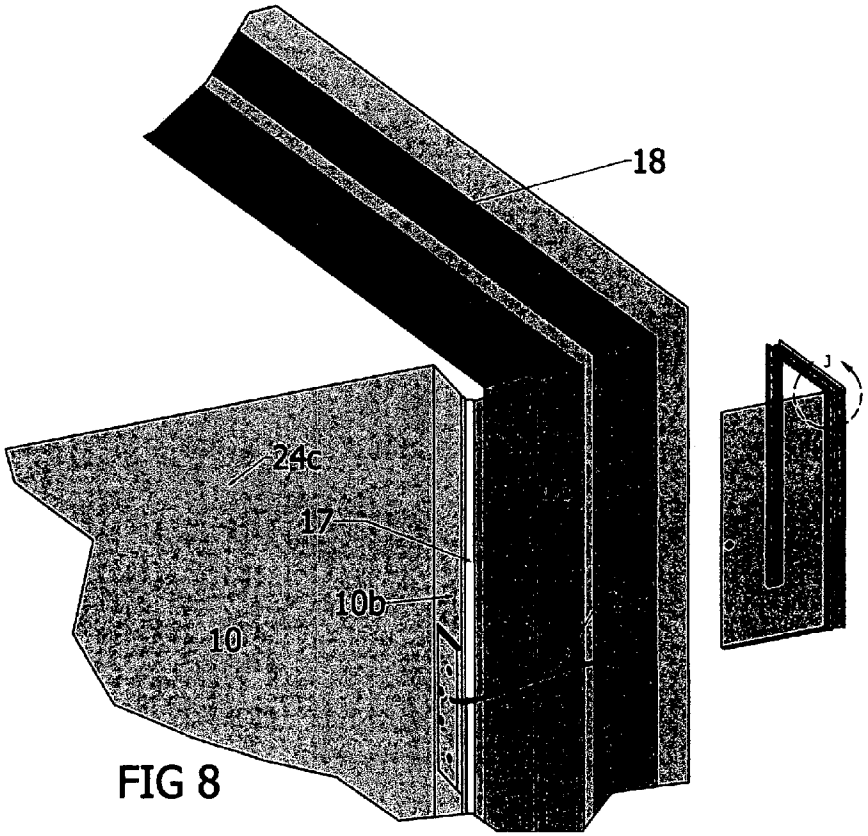
FIG. 8 shows an alternative passage of an alarm lead through the door.
Figure 9:
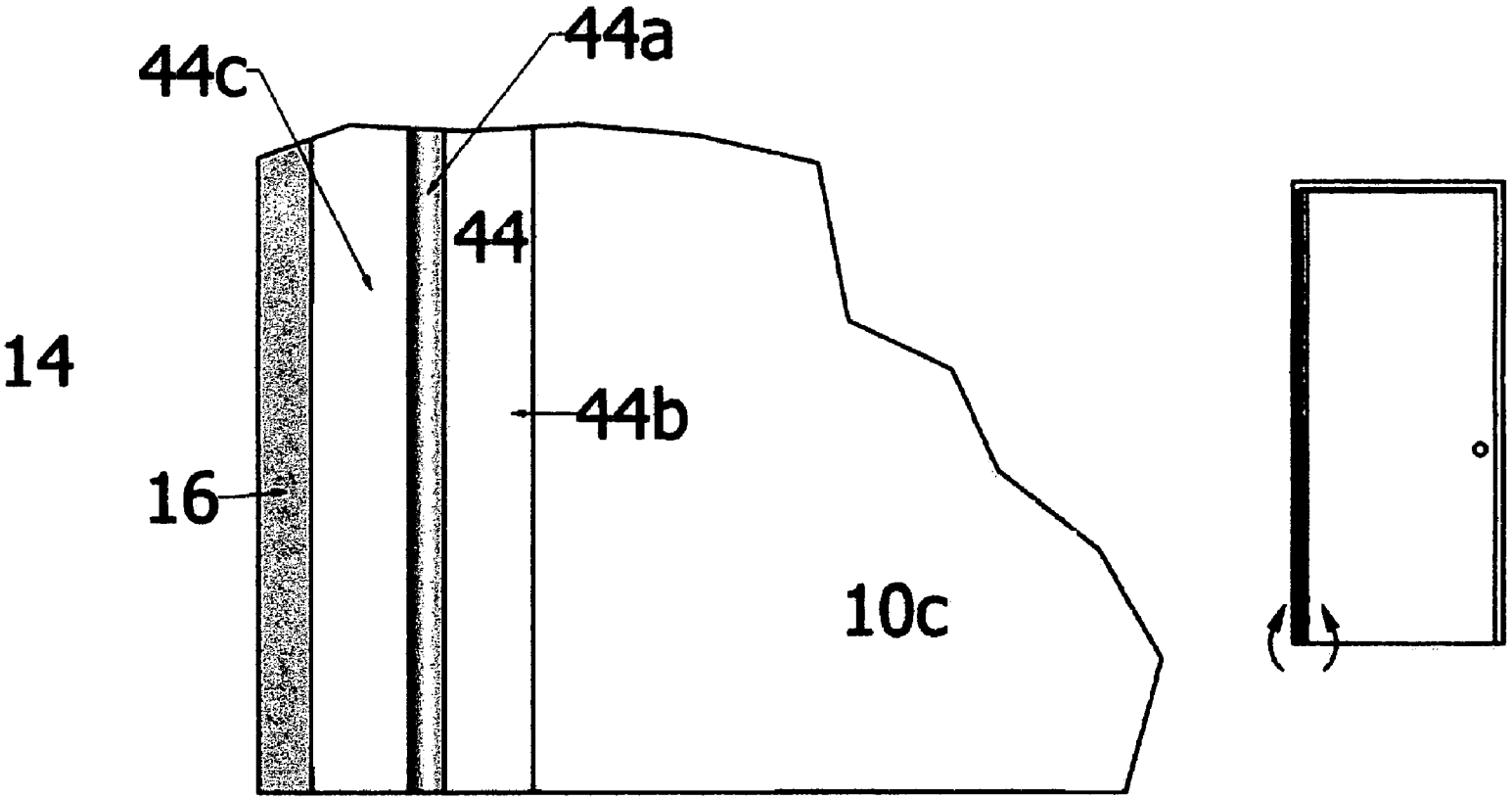
FIG. 9 is a view of a hinge cover applied over the door hinge.

As seen in FIGS. 7 and 8, the hinge 17 is preferably a continuous hinge, such as a piano hinge, which extends substantially the full height of the door. The hinge 17 includes a door plate 17a and jamb plate 17b which have knuckles, as is known, through which a pin extends to connect the door and jamb flaps. As seen in FIG. 7, the switch lead 24c passes through an opening 17c near the top of the hinge 17. The wiring then extends down along one of the hinge plates 17a. The wire extends substantially the full height of the door hinge (and hence, substantially the full height of the door opening).

In FIG. 8, the alarm lead 24c passes between the front and back surfaces 10c of the door and exit the door along the door edge 10b. The alarm lead 24c then passes down the inside of the hinge 17 and exits the hinge 17 at the bottom thereof, as seen in FIG. 6.

Whether the alarm lead 24c extends down the outside or inside of the hinge 17, the wire is directed through an opening 42 (FIG. 6) either in the wall 14 or in the hinge plate 17b. The wire 24c will then pass through the wall to be connected to the alarm 28. So that the wiring will not be accessible (or visible) a cover 44 is applied over the hinge 17. The cover 44, as seen in FIG. 6 includes an elongate channel member 44a which covers hinge knuckles and side flaps 44b, c which extend from opposite sides of the channel member to cover the hinge plates 17a and 17b. The hinge cover side flaps 44b,c are secured to the door and the door jamb, respectively. The cover flaps 44b and 44c can be secured in place using any conventional means. For example fasteners or adhesive can be used to secure the cover 44 in place. The cover encloses the wire along the full height of the door. The wall/jamb hole 42, through which the wire passes to be electrically connected to the alarm, is positioned so as to be covered by the hinge cover 44. Hence, substantially no portion of the wire will be exposed.

FIGS. 6-9 show the door with the switch mounted in accordance with FIG. 4a or 4b. It will be appreciated that in a surface mounting of the switch 24, as shown in FIG. 5, that the alarm lead 24 will be handled in much the same manner so that the wire will not be visible or accessible to a patient.

I have described an alarm system which will notify hospital staff in the event a patient drapes a sheet or the like over the top of a door and closes the door to hold the sheet in place as a warning that the patient might be attempting to commit suicide. I have also shown two methods of handling the wires for a hard wired system. It will be appreciated that the alarm wires can be handled or treated in other ways as well. However, what is important is that the wires be well hidden and protected so that a patient cannot get access to the alarm system wires.

As various changes could be made in the above constructions without departing from the scope of the invention, it is intended that all matter contained in the above description or shown in the accompanying drawings shall be interpreted as illustrative and not in a limiting sense. For example, although the switch is described to be a normally open switch, the switch could be a normally closed switch. In this instance, when the circuit is opened, the alarm is activated. The hinge 17 could be a hinge provided with a wire tube, and the alarm lead could then be passed through the wire tube. This might eliminate that need for the hinge cover. Although the bracket 32 is disclosed to be an elongate bracket which extends substantially the full length of the door, and hence substantially the full length of the switch 24, the bracket could be comprised of discrete portions which secure the switch to the door at discrete locations along the length of the switch. The switch lead wire 24c need not extend the full height of the door. Rather, the switch could be passed into the wall at any convenient point along the height of the door. Thus, where the alarm is mounted outside the patient room, the wire could pass through the wall at a point generally aligned with the height of the alarm. These examples are merely illustrative.

The invention claimed is:

[1. A door alarm system comprising:

a door frame having opposed side jambs and a header extending between said jambs, said door frame defining an opening;

a door mounted in said door frame by a hinge assembly to be movable between an open position and a closed position; said door having a top, bottom and sides; said door top and said header defining a gap when said door is closed;

a pressure sensitive switch mounted to the door proximate the door top; the switch extending substantially the full length of the door between the sides of said door; said switch having a height such that said switch extends into said gap when said door is closed; and an alarm;

said switch being in communication with said alarm; whereby, when said switch detects pressure anywhere along its length, said switch will transmit a signal to activate said alarm.]

[2. The door alarm system of claim 1 further including a bracket mounted to said door; said bracket mounting said switch to said door.]

[3. The door alarm system of claim 2 wherein said bracket has a base and opposed side members extending upwardly from said base; said side members being shaped to receive said switch and hold said switch in said bracket.]

[4. The door alarm system of claim 2 wherein said bracket is an elongate bracket and extends substantially the full length of said door.]

[5. The door alarm system of claim 1 wherein said door includes a channel in said door top; said switch being received in said channel; the switch extending out a top of said channel.]

[6. The door alarm system of claim 5 comprising a spacer in said channel below said switch.]

[7. The door alarm system of claim 1 including a door beam mounted to said door and a head beam mounted to said header; said door beam having a length substantially the width of said door; and said header beam having a length substantially equal to the length of said door frame header; said header beam being spaced above said door beam; said gap being defined by said door beam and header beam; said switch being mounted to said door beam to extend into said gap.]

[8. The door alarm system of claim 1 wherein said alarm is a visual and/or an audible alarm.]

[9. The door alarm system of claim 1 wherein said alarm is positioned on an outside of a wall in which said door is mounted.]

[10. The door alarm system of claim 1 wherein said alarm is positioned in a central location of a facility.]

[11. The door alarm system of claim 1 wherein said switch includes a lead wire to electrically connecting said switch and said alarm; said lead wire extending along at least a portion of the height of the door proximate the hinge; said wire passing into said wall to be electrically connected to said alarm.]

[12. The door alarm system of claim 11 wherein said hinge is a piano hinge and extends downwardly from near the top of said door.]

[13. The door alarm system of claim 12 wherein said piano hinge extends substantially the full length of said door.]

[14. The door alarm system of claim 12 wherein said switch lead wire extends down one of an inside surface and an outside surface of said piano hinge.]

[15. The door alarm system of claim 12 further including a hinge cover applied over said hinge; said hinge cover being sized and shaped to cover any exposed portion of said switch lead wire.]

[16. A method for notifying hospital personnel of a suicide attempt by a patient, said method comprising:

providing a door alarm system for a door to or in a patient's room;

said door alarm system comprising an elongate pressure sensitive switch proximate the top of a door, said switch extending into a gap above said door; said switch being in communication with said door alarm system to activate an alarm when said door is closed with said item hanging over the top of the door.]

*17. A door alarm system configured to notify personnel that a patient is attempting to commit suicide, the door alarm system comprising:*

*a sensing element configured to be disposed proximate to or on a top portion of a door such that the sensing element extends along a width of the door; and*

*an alarm configured to be coupled to the sensing element to receive a signal from the sensing element such that the alarm is active when the sensing element detects an item hanging over the top portion of the door being used by a patient in an attempt to commit suicide using the item, the alarm configured to notify personnel that the patient is attempting to commit suicide.*

*18. The door alarm system of claim 17, wherein the sensing element is configured to extend along a full width of the door between lateral side portions of the door and detect, at any location along the sensing element, the item hanging over the top portion of the door.*

*19. The door alarm system of claim 17, wherein the sensing element is configured to be mounted on the door.*

*20. The door alarm system of claim 17, further comprising a switch including the sensing element.*

*21. The door alarm system of claim 20, wherein the switch is a pressure sensitive switch, and wherein the sensing element of the pressure sensitive switch is configured to detect a pressure applied to the switch anywhere along a length of the switch.*

*22. The door alarm system of claim 21, wherein the pressure sensitive switch is a ribbon switch.*

*23. The door alarm system of claim 21, wherein the pressure sensitive switch is configured to be activated by a pressure of less than five pounds per square inch applied to the pressure sensitive switch.*

*24. The door alarm system of claim 21, wherein the pressure sensitive switch is configured to be activated by a pressure of between three and five pounds per square inch applied to the pressure sensitive switch.*

*25. The door alarm system of claim 17, further comprising a first lead wire extending from one end of the sensing element and a second lead wire extending from an opposite end of the sensing element.*

*26. The door alarm system of claim 17, wherein the alarm is configured to indicate a room from which the alarm originates.*

*27. The door alarm system of claim 17, wherein the alarm includes an audible and/or visual alarm.*

*28. The door alarm system of claim 17, wherein the sensing element is wired to the alarm.*

*29. The door alarm system of claim 17, wherein the signal received by the alarm from the sensing element is a wireless signal.*

*30. The door alarm system of claim 17, wherein the alarm is configured to be coupled to the sensing element to receive the signal from the sensing element such that the alarm is active when the sensing element detects, at any location along the sensing element, the item hanging over the top portion of the door when the door is closed.*

*31. A method for notifying personnel, via a door alarm system, of an attempt by a patient to commit suicide by hanging, the method comprising:*

*at a sensing element, detecting presence of an item hanging over a top portion of a door; and*

*activating an alarm to notify personnel that the item hanging over the top portion of the door is being used by a patient in an attempt to commit suicide by hanging from the door.*

*32. The method of claim 31, wherein detecting presence of an item hanging over a top portion of a door includes detecting pressure generated by the item hanging over the top portion of the door at any location along the sensing element*

*when the item is used by the patient in an attempt to commit suicide by hanging from the door.*

*33. The method of claim 31, wherein detecting presence of an item hanging over a top portion of a door includes detecting presence of the item hanging over the top portion of the door at any location along the sensing element when the door is disposed in a closed position.*

*34. The method of claim 31, wherein the sensing element is in communication with the alarm to transmit a signal to activate the alarm.*

*35. A method for notifying personnel, via a door alarm system, of an attempt by a patient to commit suicide by hanging using an item positioned over a top portion of a door, the method comprising:*

*disposing a pressure sensitive switch proximate to or on a top portion of a door along a width of the door, wherein the pressure sensitive switch is configured to detect a pressure applied to the pressure sensitive switch anywhere along a length of the pressure sensitive switch; and*

*coupling an alarm to the pressure sensitive switch to receive a signal from the pressure sensitive switch;*

*wherein the alarm is active when the pressure sensitive switch detects a pressure applied to the pressure sensitive switch by an item being used by a patient in an attempt to commit suicide by hanging from the door; and*

*whereby the alarm can be used to notify personnel that the patient is attempting to commit suicide.*

*36. The method of claim 35, wherein disposing a pressure sensitive switch proximate to or on a top portion of a door along a width of the door includes disposing the pressure sensitive switch along a full width of the door between lateral side portions of the door.*

*37. The method of claim 35, wherein coupling an alarm to the pressure sensitive switch includes wirelessly coupling the alarm to the sensing element.*

*38. The method of claim 35, wherein disposing a pressure sensitive switch proximate to or on a top portion of a door along a width of the door includes disposing the pressure sensitive switch on the door.*

*39. The method of claim 35, wherein the alarm is active when the pressure sensitive switch detects the pressure applied to the pressure sensitive switch by the item being used by a patient to commit suicide by hanging from the door when the door is closed.*

*40. The door alarm system of claim 17, wherein the sensing element is pressure sensitive along its entire length, and wherein the alarm is configured to be coupled to the sensing element to receive the signal from the sensing element such that the alarm is active when the sensing element detects, at any location along the length of the sensing element, a pressure applied to the sensing element by the item hanging over the top portion of the door.*

*41. The door alarm system of claim 40, further comprising a housing containing the sensing element.*

*42. The door alarm system of claim 25, wherein at least one of the first lead wire and the second lead wire includes a resistor for monitoring breaks in a circuit defined by the at least one of the first lead wire and the second lead wire such that operational performance of the door alarm system can be monitored.*

*43. A door alarm system configured to notify personnel of an attempt by a patient to commit suicide by hanging using an item positioned over a top portion of a door, the door alarm system comprising:*

*a pressure sensitive switch configured to be disposed proximate to or on a top portion of a door and to detect a pressure applied to the pressure sensitive switch anywhere along a length of the pressure sensitive switch; and*

*an alarm configured to be coupled to the pressure sensitive switch to receive a signal from the pressure sensitive switch, the alarm configured to be activated by the pressure sensitive switch when an item hanging over the top portion of the door is being used by a patient in an attempt to commit suicide by hanging from the door.*

*44. The door alarm system of claim 43, wherein the pressure sensitive switch is configured to be mounted on the door.*

*45. The door alarm system of claim 43, wherein the pressure sensitive switch is configured to activate the alarm when the item is hanging over the top portion of the door and the door is closed.*

*46. The door alarm system of claim 43, further comprising a first lead wire extending from one end of the sensing element and a second lead wire extending from an opposite end of the sensing element, wherein at least one of the first lead wire and the second lead wire includes a resistor for monitoring breaks in a circuit defined by the at least one of the first lead wire and the second lead wire such that operational performance of the door alarm system can be monitored.*

*47. A door alarm system comprising:*

*a door frame;*

*a door coupled to said door frame;*

*a sensing element disposed proximate to or on a top portion of the door; and*

*an alarm coupled to the sensing element and configured to receive a signal from the sensing element when the sensing element detects an item being used by a patient in an attempt to commit suicide by hanging from the door, the alarm configured to notify personnel in response to the received signal of the attempt to commit suicide.*

*48. The door alarm system of claim 47, further comprising a pressure sensitive switch including the sensing element, and wherein the sensing element of the pressure sensitive switch is configured to detect a pressure applied to the switch anywhere along a length of the switch.*

*49. The door alarm system of claim 47, wherein the alarm is configured to be active when the sensing element detects the item hanging over the top portion of the door when the door is closed.*

* * * * *